(No Model.)
C. BRISTOW.
RAISIN SEEDING MACHINE.
No. 561,255.   Patented June 2, 1896.
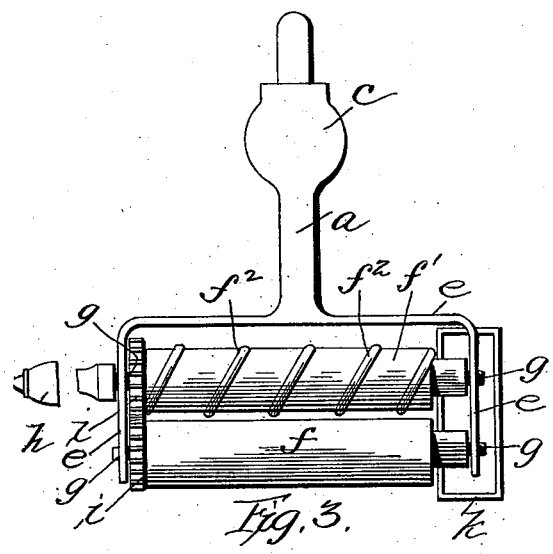
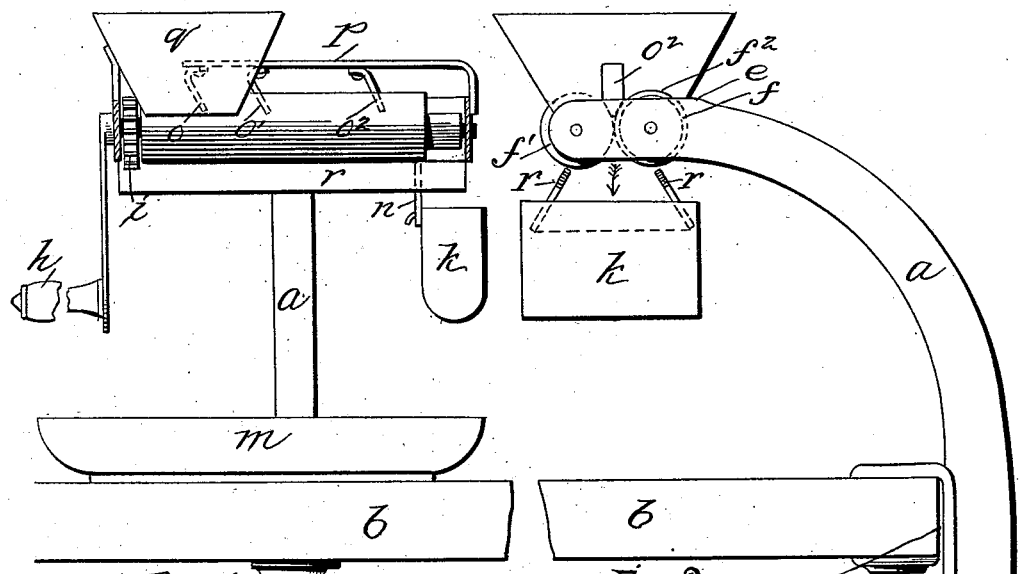

UNITED STATES PATENT OFFICE.

CHARLES BRISTOW, OF WELLINGTON, NEW ZEALAND.

RAISIN-SEEDING MACHINE.

SPECIFICATION forming part of Letters Patent No. 561,255, dated June 2, 1896.

Application filed January 4, 1896. Serial No. 574,383. (No model.)

*To all whom it may concern:*

Be it known that I, CHARLES BRISTOW, a subject of the Queen of Great Britain, residing at 42 Lambton Quay, in the city of Wellington, in the Colony of New Zealand, have invented an Improved Raisin-Seeding Machine, of which the following is a specification.

The object of my invention is to obviate the necessity for the unpleasant and wasteful practice of stoning or seeding raisins by hand, and providing a machine which will entirely remove the seeds from the raisins and deliver the said seed in a comparatively clean condition into a separate receptacle.

My invention is illustrated on the accompanying sheet of drawings, on which—

Figure 1 is a front view of my machine. Fig. 2 is a side view of the same, and Fig. 3 is a plan looking down on the same.

$a$ is a standard clipped to the table $b$ by the jaw $c$ and screw $d$ or in any usual manner. This standard $a$ carries a frame $e$, in which revolve rollers $f$ and $f'$ in bearings $g$. These rollers are revolved by hand by means of the handle $h$ through the medium of the toothed wheels $i$ and $i'$. The rollers $f$ and $f'$ are set at such a distance apart that the raisins can be squeezed between them without allowing the seeds to pass, so that the seeds remain above and are slid along by means of the spirals $f^2$, attached to one of the rollers, and deposited in the receptacle $k$, while the raisins drop through the rollers and are caught in any suitable plate or receptacle $m$, the plate $n$ preventing them reaching the seed-receptacle $k$. To more thoroughly clean the raisin-seeds from pulp, spring-teeth $o$, $o'$, and $o^2$ are supported by a bar $p$ and project down between the upper portions of the rollers, so as to check the progress of the seeds and rub them against the spiral $f^2$. $r$ are scrapers to clean the rollers $f$ and $f'$ from any adhering matter. The raisins are fed into the rollers from a hopper $q$.

Having now described my invention, I declare that what I claim, and desire to secure by Letters Patent of the United States, is—

A raisin-seeder consisting of the two rollers one of which has a spiral-thread means for feeding the raisins to the bight of the rolls, the receptacle at one end of the rollers, the spring-teeth $o$, $o'$, $o^2$, extending down between the rollers from above, the guard-plate $n$ extending up between the rollers from below adjacent to the receptacle and means for operating the rollers, substantially as described.

CHARLES BRISTOW.

Witnesses:
W. E. HUGHES,
R. B. BRISTED.